United States Patent
Leoutsarakos et al.

(10) Patent No.: US 9,286,596 B2
(45) Date of Patent: Mar. 15, 2016

(54) SIGNING CEREMONY SYSTEM AND METHOD

(75) Inventors: Nikos Leoutsarakos, Montreal (CA); Oliver Lan, Thousand Oaks, CA (US); John London, Montreal (CA); Nathalie Benoit, Pacific Palisades, CA (US); Tomlinson G. Rauscher, Ellicott City, MD (US); Paul Chronopoulos, Laval (CA)

(73) Assignee: Topaz Systems, Inc., Simi Valley, CA (US)

( * ) Notice: Subject to any disclaimer, the term of this patent is extended or adjusted under 35 U.S.C. 154(b) by 845 days.

(21) Appl. No.: 12/414,893

(22) Filed: Mar. 31, 2009

(65) Prior Publication Data

US 2009/0249191 A1    Oct. 1, 2009

Related U.S. Application Data

(60) Provisional application No. 61/072,612, filed on Apr. 1, 2008.

(51) Int. Cl.
| | |
|---|---|
| *G06F 17/00* | (2006.01) |
| *G06Q 10/10* | (2012.01) |
| *G06Q 50/18* | (2012.01) |
| *H04L 9/32* | (2006.01) |
| *G06F 17/24* | (2006.01) |

(52) U.S. Cl.
CPC .............. *G06Q 10/10* (2013.01); *G06Q 50/18* (2013.01); *H04L 9/3247* (2013.01); *G06F 17/241* (2013.01)

(58) Field of Classification Search
CPC ... G06F 17/248; G06F 21/6209; G06F 21/64; G06F 2221/2151
USPC .............. 705/4, 80, 1.1, 7.21, 7.22; 715/700, 715/200, 210, 229–233, 780–781
See application file for complete search history.

(56) References Cited

U.S. PATENT DOCUMENTS

| | | |
|---|---|---|
| 5,120,908 A | 6/1992 | Zank et al. |
| 5,122,623 A | 6/1992 | Zank et al. |
| 5,544,255 A | 8/1996 | Smithies et al. |
| 5,666,420 A | 9/1997 | Micali |
| 6,091,835 A | 7/2000 | Smithies et al. |
| 6,134,326 A | 10/2000 | Micali |
| 6,236,740 B1 | 5/2001 | Lee |
| 6,307,955 B1 | 10/2001 | Zank et al. |
| 6,381,344 B1 | 4/2002 | Smithies et al. |
| 6,613,100 B2 * | 9/2003 | Miller .......................... 715/273 |

(Continued)

OTHER PUBLICATIONS

Adobe Acrobat 7.0 Professional Signature Screenshots, Sep. 23, 2005, Adobe Systems Inc., 7.0.5.*

*Primary Examiner* — Scott Baderman
*Assistant Examiner* — Howard Cortes
(74) *Attorney, Agent, or Firm* — Jeffrey G. Sheldon; Leech Tishman; Fuscaldo & Lampl (57) ABSTRACT

A system and method for conducting an electronic signing ceremony is provided. The electronic signing ceremony may include a number of defined steps performed by one or more people on a number of documents in a predetermined order. An activity, such as providing a digital signature, may be associated with each document and/or page of each document. The electronic signing ceremony system and method consolidates and streamlines the process of originating, organizing, signing, verifying, storing, and retrieving multiple documents requiring multiple signatures from one or more people virtually anywhere and at any time.

13 Claims, 6 Drawing Sheets

(56) References Cited

U.S. PATENT DOCUMENTS

| | | | |
|---|---|---|---|
| 6,671,805 B1 * | 12/2003 | Brown et al. | 713/176 |
| 6,745,327 B1 | 6/2004 | Messing | |
| 6,796,489 B2 | 9/2004 | Slater et al. | |
| 6,807,633 B1 * | 10/2004 | Pavlik | 713/170 |
| 6,895,507 B1 | 5/2005 | Teppler | |
| 6,972,754 B2 | 12/2005 | Zank | |
| 7,051,206 B1 | 5/2006 | Giest et al. | |
| 7,106,888 B1 | 9/2006 | Silverbrook et al. | |
| 7,123,143 B2 | 10/2006 | Zank et al. | |
| D532,009 S | 11/2006 | Zank et al. | |
| 7,139,910 B1 | 11/2006 | Ainsworth et al. | |
| 7,143,290 B1 | 11/2006 | Ginter et al. | |
| 7,190,815 B2 | 3/2007 | Zank et al. | |
| 7,200,749 B2 | 4/2007 | Wheeler et al. | |
| 7,221,781 B2 | 5/2007 | Silverbrook et al. | |
| 7,436,397 B2 | 10/2008 | Zank | |
| 7,526,108 B2 | 4/2009 | Zank et al. | |
| 7,693,312 B2 | 4/2010 | Zank et al. | |
| 7,822,690 B2 * | 10/2010 | Rakowicz et al. | 705/75 |
| 7,876,930 B2 | 1/2011 | Zank et al. | |
| 7,933,840 B2 | 4/2011 | Zank | |
| 2002/0053021 A1 * | 5/2002 | Rice et al. | 713/155 |
| 2002/0091651 A1 * | 7/2002 | Petrogiannis et al. | 705/76 |
| 2003/0078880 A1 * | 4/2003 | Alley et al. | 705/38 |
| 2003/0093677 A1 * | 5/2003 | Neill | 713/176 |
| 2004/0085355 A1 * | 5/2004 | Harmes et al. | 345/751 |
| 2004/0181756 A1 * | 9/2004 | Berringer et al. | 715/530 |
| 2004/0193543 A1 * | 9/2004 | Nord et al. | 705/50 |
| 2004/0236694 A1 * | 11/2004 | Tattan et al. | 705/50 |
| 2005/0102520 A1 * | 5/2005 | Baxter et al. | 713/176 |
| 2005/0177389 A1 * | 8/2005 | Rakowicz et al. | 705/1 |
| 2005/0243371 A1 * | 11/2005 | Kanaya et al. | 358/1.18 |
| 2006/0161838 A1 * | 7/2006 | Nydam et al. | 715/512 |
| 2006/0179320 A1 * | 8/2006 | Berringer et al. | 713/180 |
| 2007/0022032 A1 * | 1/2007 | Anderson et al. | 705/35 |
| 2007/0078853 A1 * | 4/2007 | Shutt | 707/8 |
| 2007/0118732 A1 * | 5/2007 | Whitmore | 713/155 |
| 2007/0143324 A1 * | 6/2007 | Eichhorst | 707/101 |
| 2007/0265962 A1 * | 11/2007 | Bowe et al. | 705/40 |
| 2008/0016357 A1 * | 1/2008 | Suarez | 713/176 |
| 2008/0034213 A1 * | 2/2008 | Boemker et al. | 713/176 |
| 2008/0097777 A1 * | 4/2008 | Rielo | 705/1 |
| 2008/0098305 A1 * | 4/2008 | Beland | 715/719 |
| 2008/0235577 A1 * | 9/2008 | Veluchamy et al. | 715/268 |
| 2008/0243554 A1 * | 10/2008 | Pappas | 705/4 |
| 2008/0243662 A1 * | 10/2008 | Subramaniam | 705/35 |
| 2009/0157538 A1 * | 6/2009 | Subramaniam et al. | 705/35 |
| 2009/0292786 A1 * | 11/2009 | McCabe et al. | 709/206 |

* cited by examiner

SIGNING CEREMONY SYSTEM AND METHOD

CROSS-REFERENCE TO RELATED APPLICATIONS

This application claims the benefit of U.S. Provisional Application Ser. No. 61/072,612, filed Apr. 1, 2008.

TECHNICAL FIELD

The following relates to a method and system for conducting an electronic signing ceremony, and more particularly an electronic signing ceremony system and method that can consolidate and streamline the process of originating, organizing, signing, verifying, storing, and retrieving multiple documents requiring multiple signatures virtually anywhere and at any time.

BRIEF DESCRIPTION OF THE DRAWINGS

A detailed description and accompanying drawings are set forth below.

DETAILED DESCRIPTION

As required, detailed embodiments of the present application are disclosed herein. However, it is to be understood that the disclosed embodiments are merely exemplary of the invention that may be embodied in various and alternative forms. The figures are not necessarily to scale, and some features may be exaggerated or minimized to show details of particular components. Therefore, specific structural and functional details disclosed herein are not to be interpreted as limiting, but merely as a representative basis for teaching one skilled in the art to variously employ the teachings of the present application.

The eSign Act of 2000 defines an electronic signature broadly to encompass a wide variety of different ways that two individuals have available when they want to meet and have an understanding. Non-limiting examples of electronic signatures identified in the eSign Act include a symbol, sound or process. According to the eSign Act, an electronic signature must attest to both the meeting of two minds and the willingness of two minds to meet. Handwritten signatures or electronic signatures (e.g., captured using a signature pad) have limited capabilities, since they can only partially attest to the former. The mathematics related to "digital signatures" are an improvement over handwritten signatures because it provides a certain and secure way to attest not only that two minds met and agreed on a subject but also when the meeting occurred.

The willingness of two minds to meet, which is often called "intent to sign," has not been properly addressed to date because current systems revolve around the notion of an audit trail. As the word "audit" implies, an audit trail attests to what has happened during a signing session, i.e., an audit trail is nothing more than a reporting mechanism. In addition, an audit trail, by its nature, is a reflection of the signing session. If the signing session is a fragmented set of disjointed signing activities, the audit trail will also be fragmented, falling short from capturing intent properly.

The eSign Act focuses on the context of obtaining a digital signature as reinforcing or negating the validity of a digital signature. The systems on the marketplace today do not take advantage of this focus. Instead, the systems ensure the validity of a party's signature within a single page of a document. Other systems proceed to specify the type of signature or impose an order on how digital signatures are to be obtained, but within the confines of a single document. However, none of these systems take full advantage of the benefits of the eSign Act.

In light of the foregoing, there exists a need to provide a system and method of using the context of a signing ceremony to reinforce or negate the validity of a digital signature.

The electronic signing ceremony method and system embodiments described herein can be carried out using a computer. Moreover, the computer may be programmed, e.g., via the development of a computer program, to carry out the steps and functionality of the method and system embodiments disclosed herein.

Figure 1:
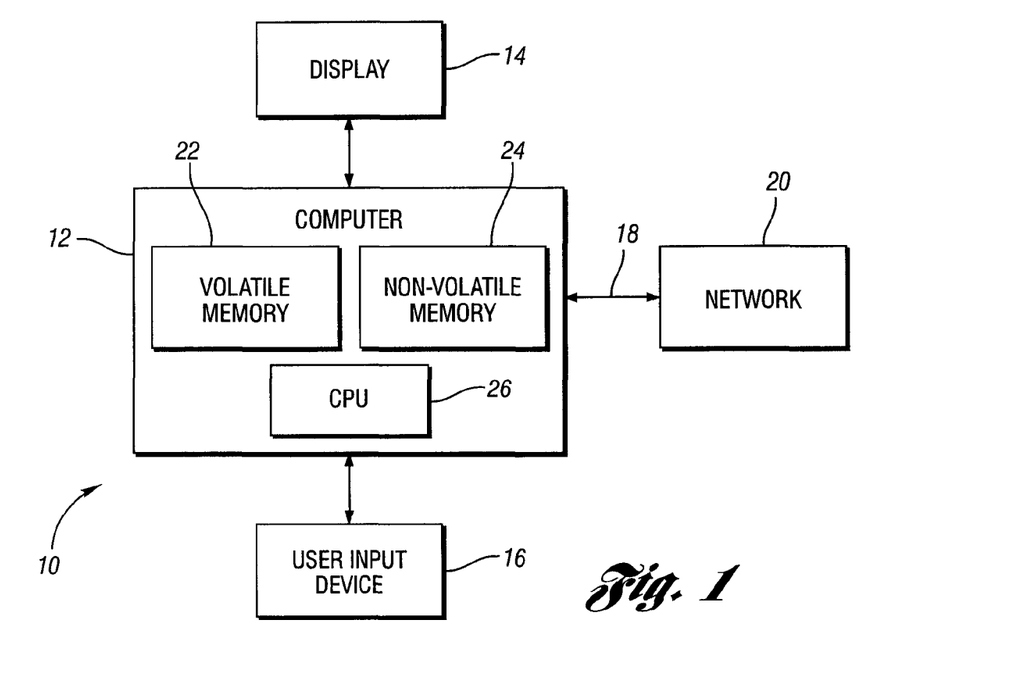
FIG. 1 depicts a simplified, exemplary computer system suitable for implementing one or more embodiments of the present application.

FIG. 1 depicts an environment, computer system 10, suitable for implementing one or more embodiments of the present application. Computer system 10 includes computer 12, display 14, user interface 16, communication line 18 and network 20.

Computer 12 includes volatile memory 22, non-volatile memory 24 and central processing unit ("CPU") 26. Non-limiting examples of non-volatile memory include hard drives, floppy drives, CD and DVD drives, and flash memory, whether internal, external, or removable. Volatile memory 22 and/or non-volatile memory 24 can be configured to store machine instructions and other information. CPU 26 can be configured to execute machine instructions to implement functions of the present application, for example, executing an electronic signing ceremony according to one or more embodiments of the present application. Volatile memory 22 and/or non-volatile memory 24 can be configured to store data relating to a signing ceremony.

Display 14 can be utilized by the user of the computer 12 to view content relating to an electronic signing ceremony and to conduct the signing ceremony through a ceremony session. A non-limiting example of display 14 is a color display, e.g. a liquid crystal display ("LCD") monitor or cathode ray tube ("CRT") monitor.

The user input device 16 can be utilized by a user to input instructions to be received by computer 12. The instructions can be instructions for receiving a digital signature of a user. The user input device 16 may be an electronic signature pad, a keypad, a microphone, or a fingerprint scanner. In other embodiments, the user input device 16 can be a keyboard having a number of input keys, a mouse having one or more mouse buttons, a touchpad or a trackball, or combinations thereof.

Computer 12 can be configured to be interconnected, wired and/or wirelessly, to network 20, through communication line 18, for example, a local area network ("LAN") or wide area network ("WAN"), through a variety of interfaces, including, but not limited to dial-in connections, cable modems, high-speed lines, and hybrids thereof. Firewalls can be connected in the communication path to protect certain parts of the network from hostile and/or unauthorized use.

Computer 12 can support TCP/IP protocol which has input and access capabilities via two-way communication lines 18. The communication lines can be an intranet-adaptable communication line, for example, a dedicated line, a satellite link, an Ethernet link, a public telephone network, a private telephone network, and hybrids thereof. The communication lines can also be intranet-adaptable. Examples of suitable communication lines include, but are not limited to, public telephone networks, public cable networks, and hybrids thereof.

In one embodiment, an electronic signing ceremony method and system is disclosed. The electronic signing ceremony may include a number of defined steps performed by one or more people on a number of documents in a predetermined order. A non-limiting example of an electronic signing ceremony is a mortgage transaction. For instance, a mortgage banker may create an electronic signing ceremony that includes a number of documents that are signed by the mortgage banker's customer, e.g., a home buyer and spouse.

As used in one or more embodiments, a step is an activity performed on a document. For example, a step may be the presentment and execution of a signature. As used in one or more embodiments, a signature is a digital way to bind a signer to a document. Non-limiting examples of signatures include an electronic signature, biometric signature, infometric signature, cryptographic signature, electronic sound, symbol, video, song or process. As used in one or more embodiments, a document means information in an electronic format. Non-limiting examples of documents include a loan application, a claim form, a lease agreement, and an insurance form. As used in one or more embodiments, a page is a well-defined part of a document.

Figure 2:
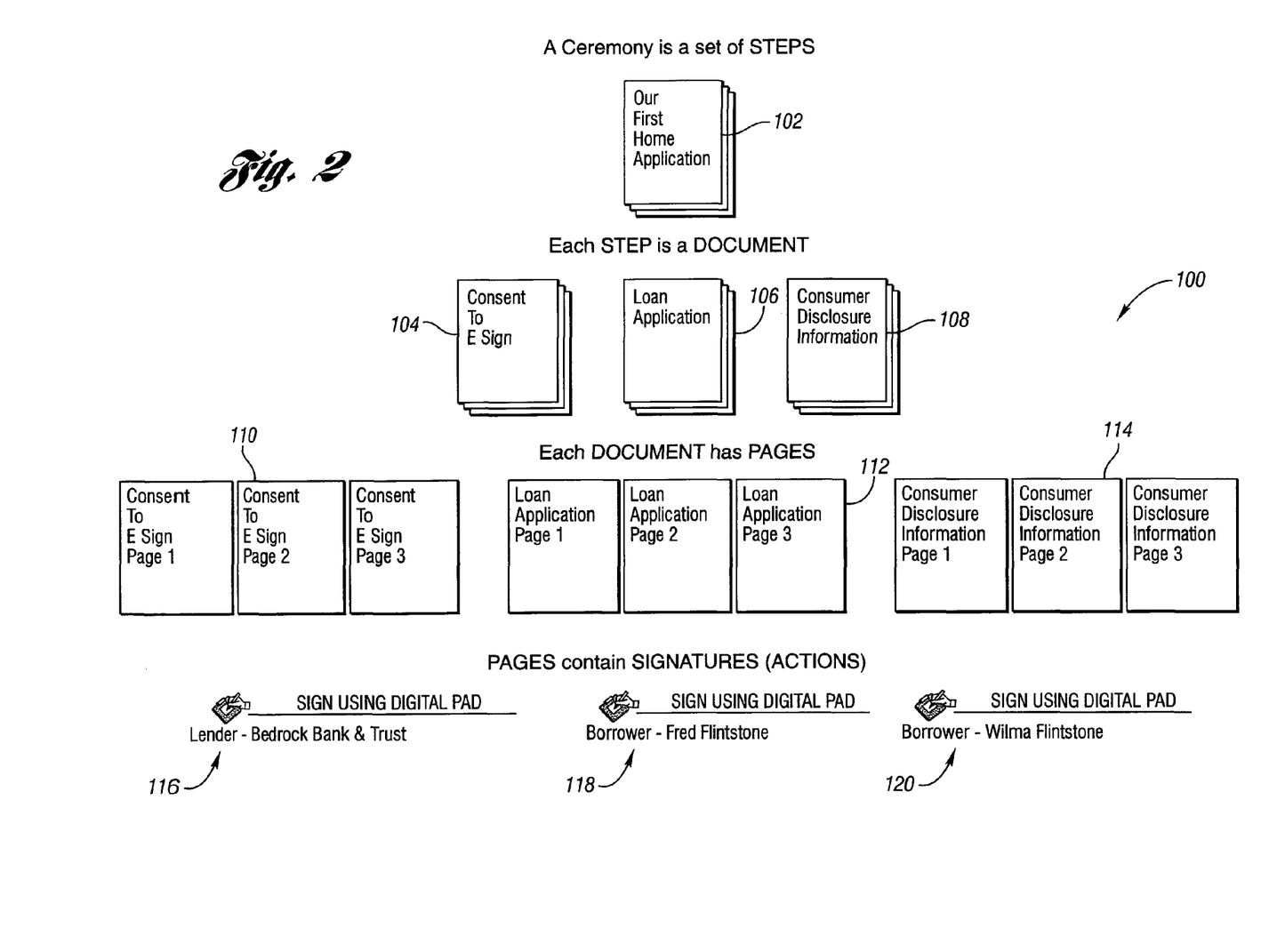
FIG. 2 depicts a simplified schematic hierarchy of a signing ceremony according to one or more embodiments of the present application.

FIG. 2 depicts a hierarchy 100 of a signing ceremony according to one or more embodiments. The ceremony, i.e., the top level of the hierarchy, includes a number of steps. For example, the number of steps may be a home loan application, as depicted by reference numeral 102 of FIG. 2. Each step, i.e., the second level of the hierarchy, comprises a document. For example, the documents may be a consent to electronically sign ("Esign") 104, a loan application 106, and a consumer disclosure information statement 108. Each document, i.e., the third level of the hierarchy, comprises a number of pages. For example, the number of pages may be the pages 110 of the consent to Esign document, the pages 112 of the loan application document, and the pages 114 of the consumer disclosure statement document. A number of actions, i.e., the bottom level of the hierarchy, are contained on one or more pages of each document. For example, one or more pages may contain a signature, which is an example of an action. One or more pages of the consent to Esign the document may include a lender signature 116. One or more pages of the loan application may include a borrower signature 118. One or more pages of the consumer disclosure statement may include a borrower signature 120.

Figure 3:
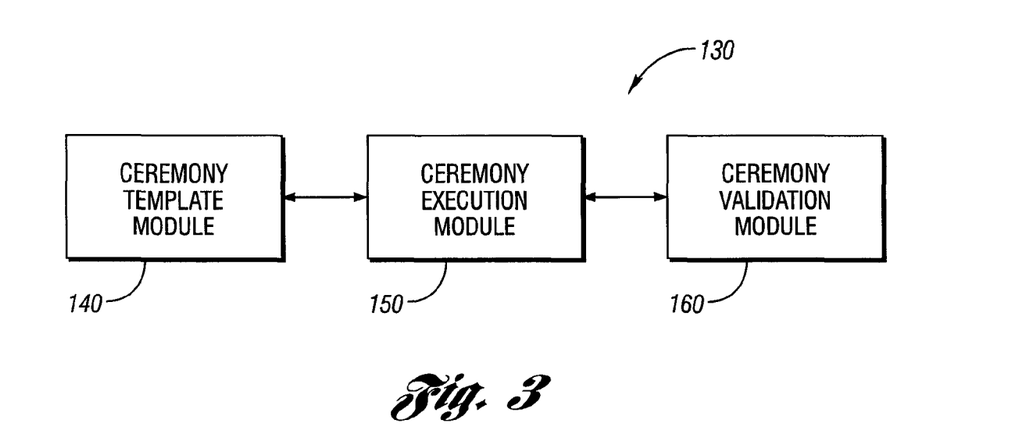
FIG. 3 depicts a simplified, exemplary block diagram illustrating a signing ceremony system according to one or more embodiments of the present application.

Referring to FIG. 3, a simplified, exemplary block diagram of an electronic ceremony system 130 according to one or more embodiments of the present application is shown. As seen therein, ceremony system 130 may include a ceremony template module 140, a ceremony execution module 150, and a ceremony validation module 160. According to one or more embodiments, the modules 140, 150, 160 may be contained within the non-volatile memory 24.

The ceremony template module 140 may include functionality to generate a ceremony template. A ceremony template can be used external to the signing ceremony system to generate an electronic ceremony for use with a ceremony execution module, as described in detail below. The ceremony template may be a document including one or more blanks that are filled in by the entity building the signing ceremony. For instance, the ceremony template may be a loan agreement document and the one or more blanks may be provided for a borrower's name and address. In one embodiment, the ceremony template document is a PDF document. The loan agreement template can be sent to a bank so that the bank may use its borrower database to provide the information in the one or more blanks.

In another embodiment, the ceremony template may include a number of documents, each having one or more blanks. The ceremony template may also include inputs for collecting and organizing documents, signers and signing devices by the bank or other entity responsible for such activities. As mentioned above, the result of utilizing the ceremony template is the generation of a signing ceremony that can be utilized by the ceremony execution module 150 during a ceremony session. As used in one or more embodiments, the ceremony session is a session in which a signing ceremony is executed.

Figure 4:
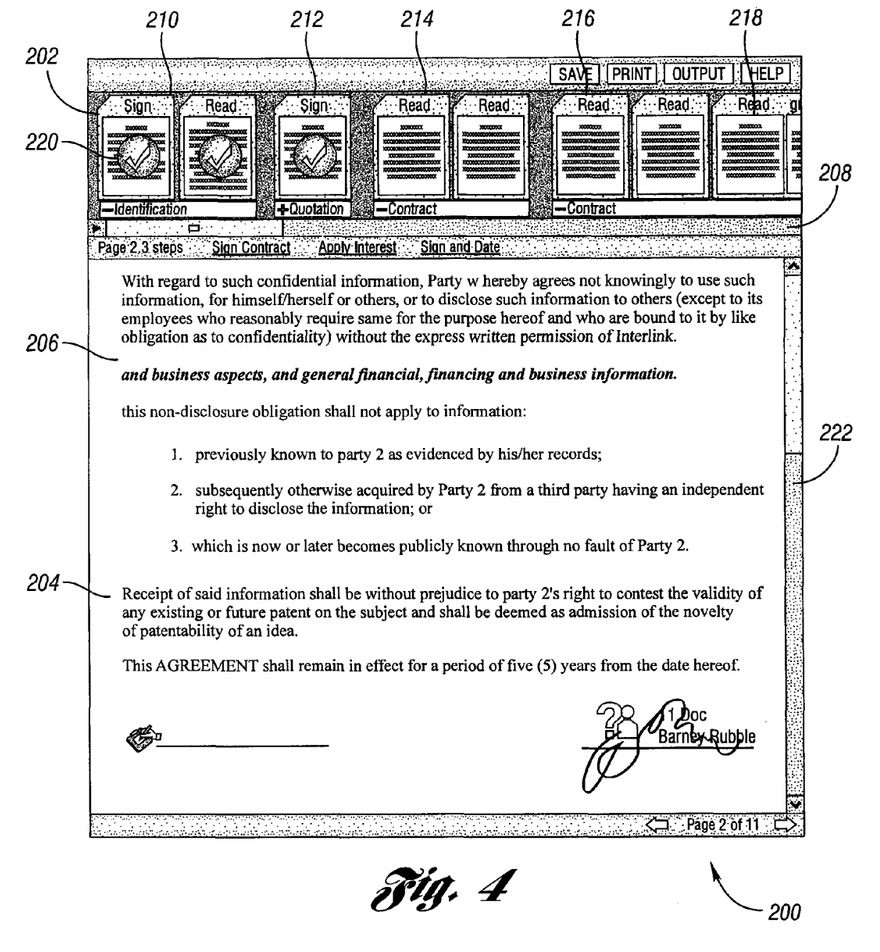
FIG. 4 depicts an example of a graphical user interface ("GUI") generated by a ceremony execution module according to one or more embodiments of the present application.

As mentioned above, in one or more embodiments, the electronic ceremony system includes a ceremony execution module 150. The ceremony execution module 150 may use a signing ceremony as the input to conduct a signing session, which may include reviewing and signing documents in a ceremony. The ceremony execution module 150 can also be configured to format data from the generated signing ceremony for display on a computer display via a graphical user interface ("GUI"). FIG. 4 depicts an example of a GUI 200 generated by the ceremony execution module according to one embodiment of the present application. The GUI 200 may include a ceremony pane 202 and a page pane 204. A ceremony page 206 may be displayed within the page pane 204. The ceremony page 206 may correspond to one or more pages of each document.

The ceremony pane 202 may include a horizontal scroll bar 208 for scrolling content displayed within the ceremony pane 202. As can be seen from FIG. 4, the content within ceremony pane 202 may include a number of documents 210, 212, 214 and 216. Document 210, displayed as an identification document, is shown in expanded format (signified by the "−" sign) so that the two pages of document 210 are displayed. It should be appreciated that the "−" sign can be clicked to collapse the document 210 into a single page icon. Document 212, displayed as a quotation document, has been collapsed into such a format (signified by the "+" sign). Document 214, displayed as a contract document, is shown in expanded format so that two pages of document 214 are displayed. Document 216, also displayed as a contract document, is shown in expanded format so that three pages and a fourth fragmented page of document 216 is displayed. The horizontal scroll bar 208 can be utilized by the user to scroll over to view the rest of the pages of document 216, as well as any other documents and pages thereof that are part of the signing ceremony.

Each document or page depicted within the ceremony pane 202 may include a header portion 218, which includes the activity that is to be carried out on each document or page. Non-limiting examples of activities that can be carried out as depicted in FIG. 4 include "sign" and "read," which indicate an instruction to read the document or page, or an instruction to read and sign the document or page. In one or more embodiments, the activity is reading and initialing each document or page. Once the activity has been executed by the user, a status icon, which may comprise a checkmark 220, may be displayed over the relevant document or page. The current document (and page thereof) in which the next action must be taken may be displayed as the left-most document (or page thereof) without a checkmark 220. In one or more embodiments, the signing activities are pre-ordered, while the reviewing order can be established by user input.

The page pane 204 may include a vertical scroll bar 222 for vertically scrolling the content displayed within the page pane 204. The content displayed within the page pane 204 may be the current page of the current document.

The GUI 200 thus described can provide the feature of presenting, reviewing and signing the documents in a signing ceremony in a pre-determined order, therefore establishing a sequence for presenting and signing documents. Beneficially, such GUI can display a road map, e.g., the ceremony pane 202, that shows the stepwise progression of the signing ceremony in a pre-determined order.

In one or more embodiments, the ceremony execution module 150 may be configured to record certain data regarding a signing session as an executed ceremony. The recorded data may be stored in a secure database. In one or more embodiments, the executed ceremony includes each document in the signing ceremony, each digital signature within the signing ceremony, a date and time of signature for each digital signature, and the date and time at which each page viewing through the GUI 200 begins.

The contents of the ceremony container, e.g., digital signatures, signers and documents, are described below for developing an example of a ceremony container.

Figure 5:
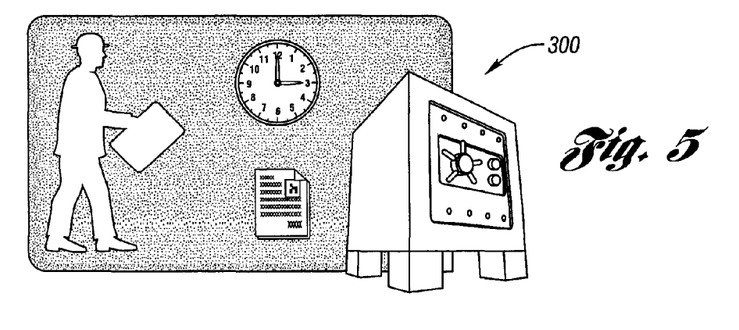
FIG. 5 depicts a simplified, exemplary schematic representation of a digital signature secure container according to one or more embodiments of the present application.

As used herein with respect to at least one embodiment, a digital signature is a secure container that contains a single document, e.g., hash, a single signer, e.g., credentials, and a timestamp bound together. Once it is created, a digital signature secure container may only be read and verified, or destroyed. FIG. 5 depicts a schematic example of a digital signature secure container 300.

Figure 6:
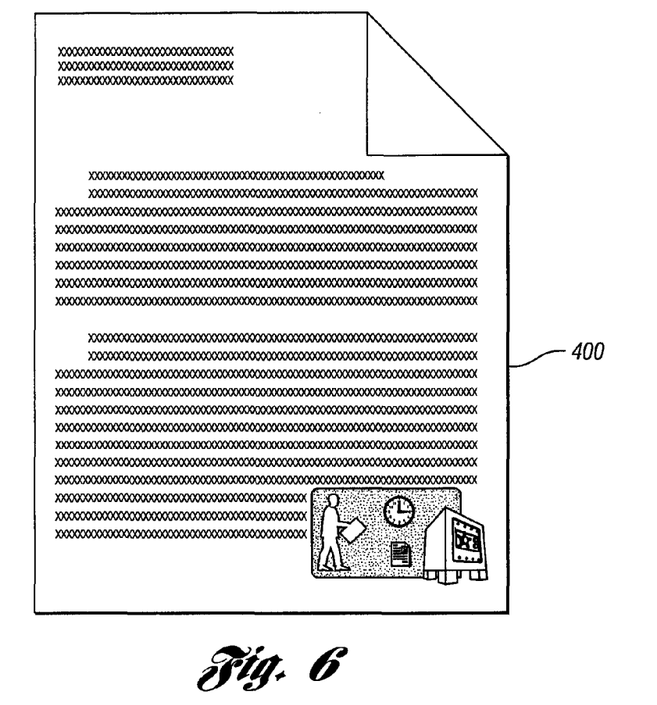
FIG. 6 depicts a simplified, exemplary schematic representation of an unsecure document container according to one or more embodiments of the present application.

As used herein with respect to at least one embodiment, a document is an unsecure container for one or more digital signatures. These documents are considered an unsecure container in that digital signature containers may be embedded and/or removed from the document at will. For example, a portable display format ("PDF") document does not provide a mechanism to protect embedded digital signature containers from improper access, placement within the PDF document and removal from the PDF document. FIG. 6 depicts a schematic example of an unsecure document container 400.

Figure 7:
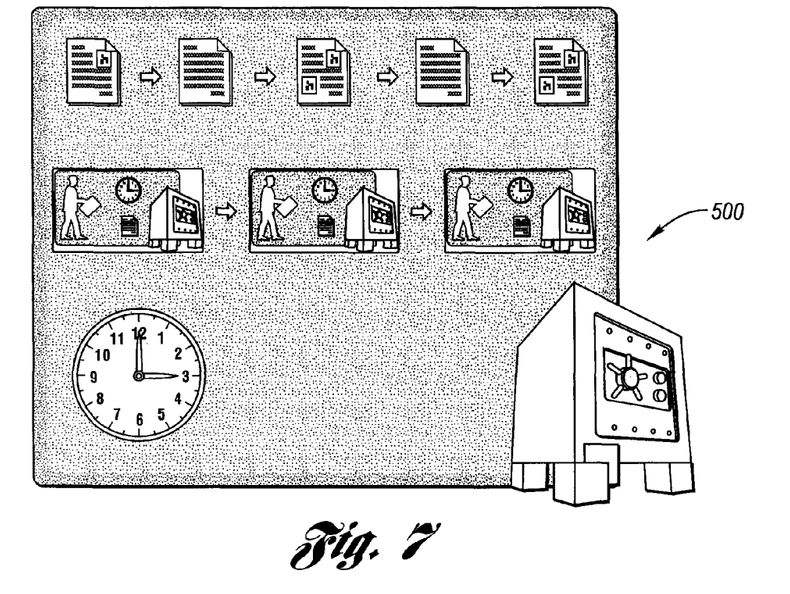
FIG. 7 depicts a simplified, exemplary schematic representation of a signing ceremony container according to one or more embodiments of the present application.

FIG. 7 depicts an example of a ceremony container 500, which includes a number of documents, a number of digital signatures, a date and time at which each page of each document is viewed, and a date and time of signing for each digital signature. The information stored in the ceremony container 500 allows for the capture of intent to sign information and the circumstances in which one or more digital signatures are obtained.

In one or more embodiments, the electronic signing ceremony system may include a ceremony validation module 160. The ceremony validation module 160 may use an executed ceremony container as input to conduct a signing validation, which may include validating the steps and activities of the ceremony.

Figure 8:
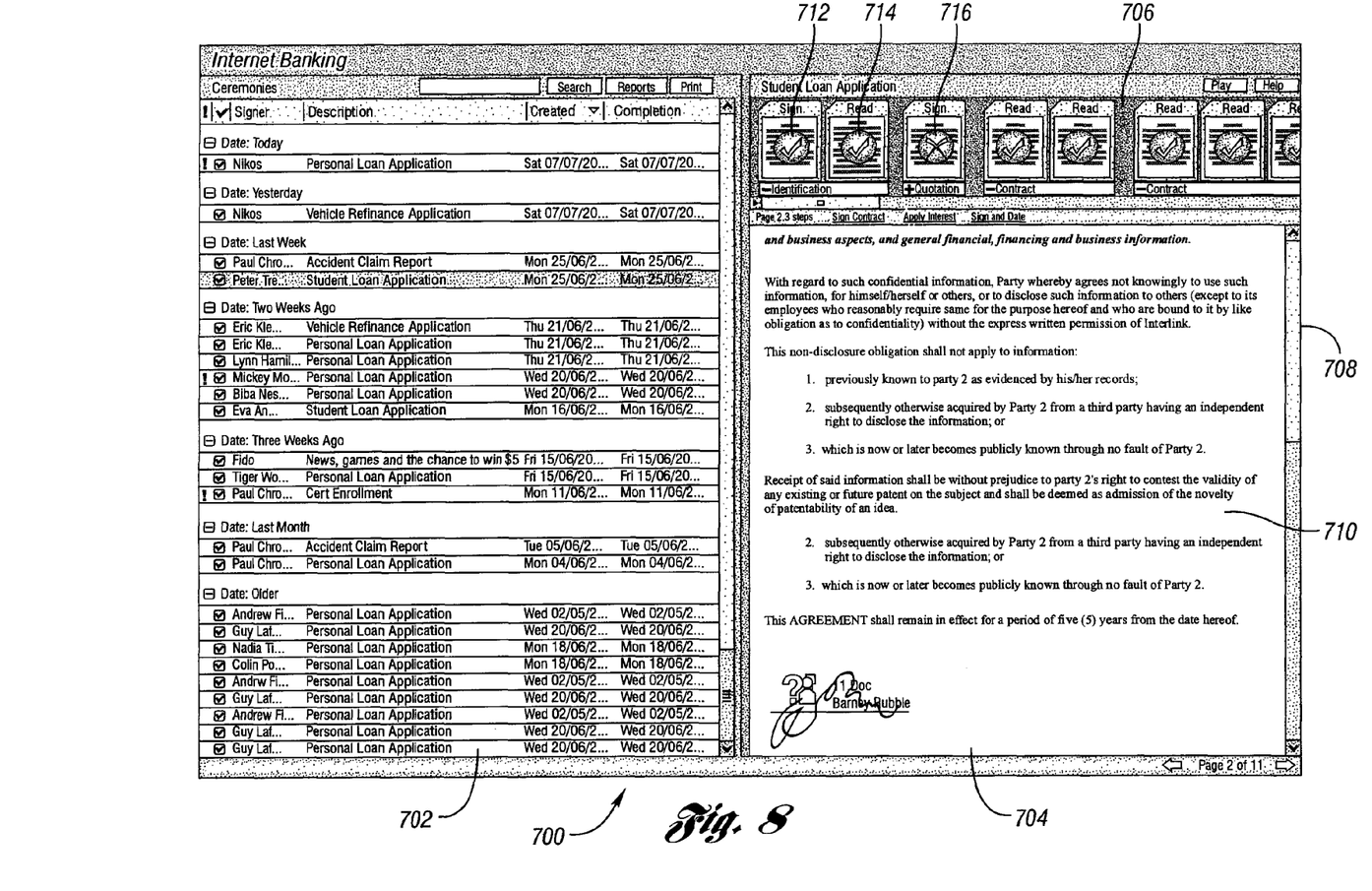
FIG. 8 depicts an example of a GUI generated by a ceremony validation module according to one or more embodiments of the present application.

The ceremony validation module 160 may also be configured to format data from the ceremony container for display on a computer display via a GUI. FIG. 8 depicts an example of a GUI 700 generated by the ceremony validation module according to one embodiment of the present application. The GUI 700 may include a ceremonies panel 702 and a selected ceremony panel 704. The ceremonies panel 702 may include a list of ceremonies for one or more users of the signing ceremony system. The selected ceremony panel 704 may include a ceremony pane 706 and a page pane 708. A ceremony page 710 may be displayed within the page pane 708. The ceremony page 710 may correspond to one or more pages of each document. In one or more embodiments, the ceremony validation module 160 can be configured to display only the executed ceremony sessions of the user that is currently logged in.

The ceremony pane 706 can display each document (and each page of each document in one or more embodiments) within the selected signing ceremony. Each document (or each page thereof) may include a status icon generated from a plurality of icons depicting the status of the one or more activities associated with the document (or page thereof) based on the ceremony container of the selected signing ceremony. Non-limiting examples of status icons may include first checkmark 712, second checkmark 714 and "x" icon 716. The first checkmark 712 denotes that the document (or page thereof) has been viewed and the activity has been carried out in the pre-determined order of the signing ceremony. The second checkmark 714 denotes that the document (or page thereof) has been viewed but the activity has not been carried out according to the pre-determined order of the ceremony. The "x" icon 716 denotes that the document (or page thereof) has been viewed but the activity has not been carried out.

In one or more embodiments, the digital signatures and documents used within the signing ceremony described above can utilize the Adobe PDF DigSig standard, available from Adobe Systems Inc. Therefore, the digital signatures generated through the signing ceremony of one or more embodiments of the present application can be verified by the use of the Adobe Acrobat Reader. Furthermore, the signing ceremony system of one or more embodiments of the present application may support other digital signature standards as well. Non-limiting examples include the MISMO DigSig standard for the mortgage industry, the SAFE standard for the pharmaceutical industry, and the NAVA standard for the annuities industry.

According to another embodiment, a computer platform for developing digital signature software products, for example, electronic signature touch pad software products, is disclosed. The computer platform may include an operating system, services, applications, and a software development architecture. The software development architecture can be utilized to develop signing, authentication and signer identification applications.

The computer software platform of one or more embodiments includes the capability to develop one or more software applications for one or more digital signing devices including one or more of the following features: secure access to the Internet, secure transmission of data, secure local storage, and secure storage of the device's credentials for device authentication. The computer software platform includes a toolkit for developing software applications for one or more digital signature devices.

The computer software platform of one or more embodiments includes the capability to develop one or more software applications for one or more digital signing devices for capturing high-quality handwritten signatures, displaying one or more color images, and measuring bio-behavior, e.g., pressure, direction, velocity, etc. The computer software platform may be used to develop applications for smart phones, iPhones, PDAs, tablet-PCs, etc. The platform may be based on the Windows Mobile 6.0 operating system. Alternatively, the platform may be based on Windows XP and VISTA, Mac OS, Linux and Blackberry (Java), and digital signature pads.

The computer platform of one or more embodiments includes the capability to migrate developed software applications from a first digital device to a second digital device. For example, the first digital device may be a desktop computer and the second digital device may be a palm device.

Figure 9:
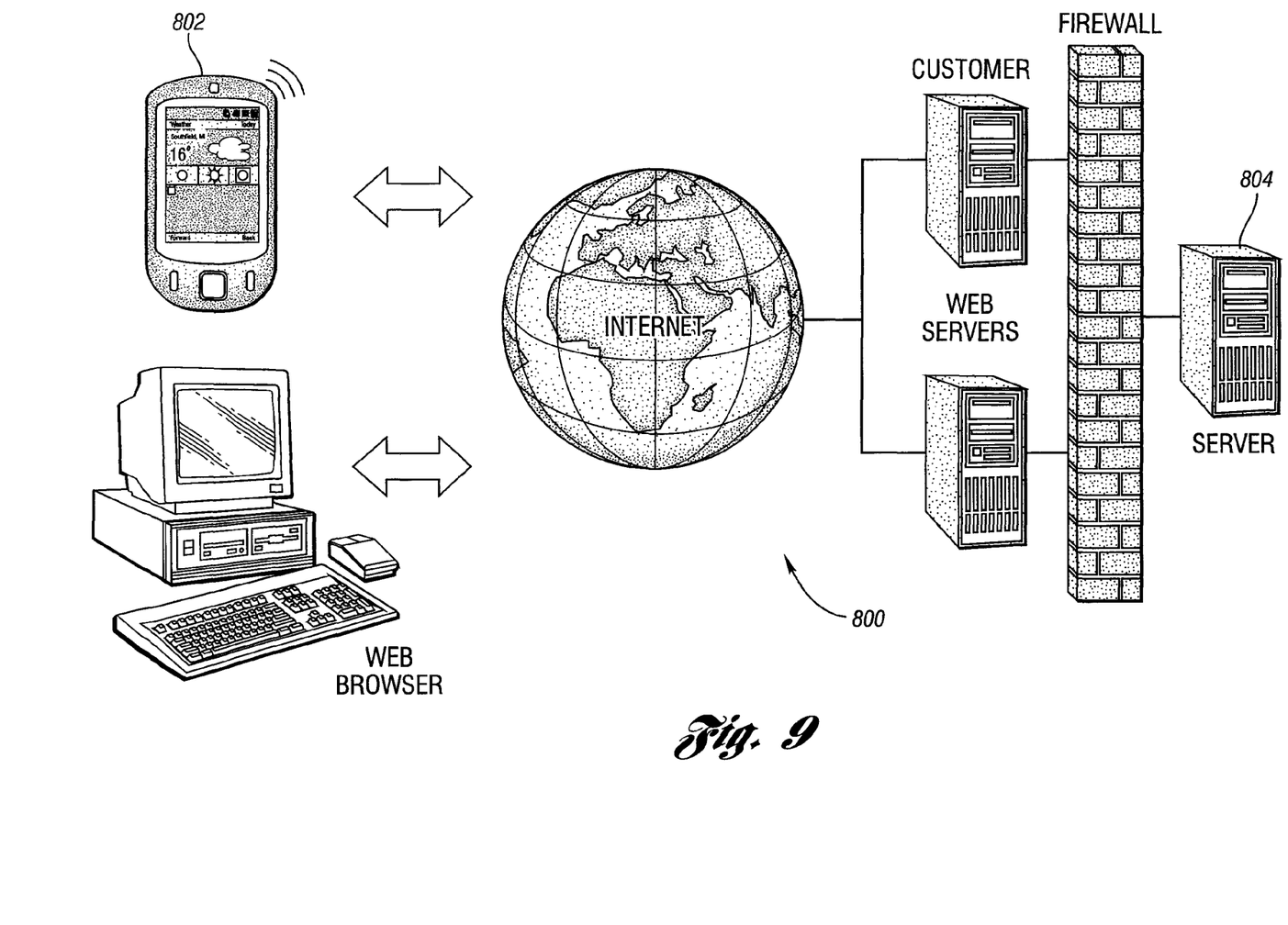
FIG. 9 depicts an example of a fragmented and distributed signing engine according one or more embodiments of the present application.

In one or more embodiments, the computer platform includes a fragmented signing engine, which is generally referenced as system 800 in the schematic diagram of FIG. 9. The fragmented signing engine may include the capability of signing locally at a client site 802, i.e., the site in which the signer is located. At the client site, the signer is allowed to use the signer's private key to sign. The fragmented signing engine functions partially at the server site 804 to hash and prepare a document for signing, and partially at the client site 802 to obtain and use the private key of the signer and to transmit the resulting digital signature back to the server site 804 to embed it into the document being signed. This distributed signing engine provides for signing mobility, i.e., mobility of the client site 802.

Using the distributed and fragmented signing engine of one or more embodiments, user and signer authentication may be added using the PKI infrastructure of the client and of the server to provide mutual authentication.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. An electronic signing ceremony system to execute a ceremony session at one or more user sites on a plurality of documents stored at a server site, wherein the plurality of documents remain at the server site at all times, at least some of the documents comprising multiple pages, at least one of the pages being a ceremony page to have an activity executed by one or more users located at the one or more user sites thereon as part of the ceremony session, the system comprising:

(a) a ceremony execution module for conducting the ceremony session at the one or more user sites, the ceremony execution module configured to (i) receive a signing ceremony input defining a plurality of steps to be performed by the one or more users located at the one or more user sites with regard to the documents stored at the server site, (ii) a predetermined order in which the documents are to be arranged for execution, and (iii) generate at least a first graphical user interface (GUI) for display on a display device located at the one or more user sites:

(b) the first GUI including a first ceremony pane and a first page pane, the first ceremony pane configured to display the documents locally at the one or more user sites, each document stored at the server site corresponding to one of the plurality of steps and arranged in the first ceremony pane to provide a progression of the signing ceremony in the same predetermined order as provided by the signing ceremony input, one of the displayed documents being an active document, the first page pane configured to display a ceremony page of the active document locally at the one or more user sites:

(c) the ceremony execution module further configured to (i) selectively display one or more of the plurality of documents in the first ceremony pane in an expanded view so that each page of the displayed document is displayed in the first ceremony pane and (ii) selectively display one or more documents in the first ceremony pane in a collapsed view so that only a single icon is displayed;

(d) the ceremony execution module further configured to receive user input corresponding to an at least one activity associated with the active document and executed by the one or more users on the displayed ceremony page until all required activities are performed on all ceremony pages in the predetermined order to execute the ceremony session, wherein the active document remains at the server site at all times and the required activities are performed locally at one or more user sites;

(e) the ceremony execution module further configured to generate an executed ceremony container containing data corresponding to the executed ceremony session; and (f) a ceremony validation module operable to conduct a signing validation, the ceremony validation module configured to:

i) receive the executed ceremony container and validate the steps and activities performed during the signing ceremony based upon the data contained in the executed ceremony container;

ii) generate at least a second GUI including a ceremonies panel and a selected ceremony panel, the ceremonies panel including a list of executed ceremony sessions for the one or more users of the signing ceremony system, the selected ceremony panel having a second ceremony pane and a second page pane, the second ceremony pane displaying each document of a selected signing ceremony, the second page pane displaying a second ceremony page corresponding to the one or more pages of each document, wherein each document in the second ceremony pane includes a status icon generated from a plurality of icons including at least a first status icon denoting that the document has been viewed and the activity associated with the document has been performed in the predetermined order, a second status icon denoting that the document has been viewed but the activity associated with the document has not been performed in the predetermined order, and a third status icon denoting that the document has been viewed but the activity associated with the document has not been performed.

2. The system of claim 1, further comprising: a ceremony template module operable to access a ceremony template for generating the signing ceremony input defining the plurality of steps to be executed during the ceremony session, the ceremony template including one or more ceremony template documents having one or more blanks and at least one input for collecting and organizing the ceremony template documents, identifying signers, identifying signing devices, and identifying the one or more entities involved in executing the ceremony session.

3. The system of claim 2, wherein the ceremony template module further includes functionality to generate a ceremony template.

4. The system of claim 2, wherein the one or more blanks are filled by the entity building the signing ceremony.

5. The system of claim 2, wherein the one or more template documents is a portable display format (PDF) document.

6. The system of claim 1, wherein the data contained in the executed ceremony container includes each document in the signing ceremony, digital signatures contained within at least one of the plurality of documents, a date and time of each digital signature, and a date and time at which a viewing of the one or more pages begins.

7. The system of claim 1, wherein the ceremony validation module is configured to display only the executed ceremony sessions of the user that is currently logged in to the signing ceremony system.

8. The system of claim 1, wherein the at least one activity includes digitally signing the ceremony page of the active document displayed in the first page pane.

9. The system of claim 1, wherein the first ceremony pane includes a scroll bar for scrolling the plurality of documents displayed in the first ceremony pane in the predetermined order.

10. The system of claim 1, wherein each document or page of the document displayed in the first ceremony pane includes a header portion identifying the at least one activity to be performed on each document or page of the document.

11. The system of claim 10, wherein the at least one activity identified in the header portion includes an instruction to read the document or page, an instruction to read and sign the document or page, or an instruction to read and initial a document or page.

12. The system of claim 10, wherein the ceremony execution module is further configured to display a status icon over each document or page of the document in which the at least one activity has been performed indicating completion of the at least one activity associated with the document or page of the document.

13. A method for conducting an electronic signing ceremony comprising:
 (a) receiving a request to conduct a signing ceremony;
 (b) initiating a ceremony session based upon the request;
 (c) receiving a signing ceremony input from a user site corresponding to the ceremony session, the signing ceremony input defining a plurality of steps to be performed by one or more users in which a plurality of documents stored on a server site are to be arranged for execution, the plurality of documents having one or more pages, wherein the plurality of documents remain at the server site at all times;
 (d) displaying a first graphical user interface (GUI) including a ceremony pane and a page pane at the user site, the ceremony pane displaying the plurality of documents, one of the displayed documents being an active document, each document corresponding to one of the plurality of steps and arranged in the ceremony pane, the page pane displaying a ceremony page of the active document in the ceremony pane, at least one of the documents in the ceremony pane being displayed in an expanded view so that each page of the expanded document is displayed in the ceremony pane, and at least one of the documents being displayed in the ceremony pane in a collapsed view so that only a single icon is displayed;
 (e) receiving user input at the user site corresponding to an at least one activity associated with the active document stored on the server site and executed by the one or more users on the displayed ceremony page until all required activities are performed on all ceremony pages to execute the ceremony session, wherein the active document remains at the server site at all times and the required activities are performed locally at one or more user sites;
 (f) generating at least a second GUI including a ceremonies panel and a selected ceremony panel, the ceremonies panel including a list of executed ceremony sessions for the one or more users of the signing ceremony system, the selected ceremony panel having a second ceremony pane and a second page pane, the second ceremony pane displaying each document of a selected signing ceremony, the second page pane displaying a second ceremony page corresponding to the one or more pages of each document, wherein each document in the second ceremony pane includes a status icon generated from a plurality of icons including at least a first status icon denoting that the document has been viewed and the activity associated with the document has been performed in the predetermined order, a second status icon denoting that the document has been viewed but the activity associated with the document has not been performed in the predetermined order, and a third status icon denoting that the document has been viewed but the activity associated with the document has not been performed; and
 (g) generating an executed ceremony container containing data corresponding to the executed ceremony session.

* * * * *